(12) United States Patent
Tormasov et al.

(10) Patent No.: US 10,554,753 B2
(45) Date of Patent: Feb. 4, 2020

(54) SYSTEM AND METHOD FOR SERVICE LEVEL AGREEMENT BASED DATA STORAGE AND VERIFICATION

(71) Applicant: Acronis International GmbH, Schaffhausen (CH)

(72) Inventors: Alexander Tormasov, Moscow (RU); Stanislav S. Protasov, Moscow (RU); Serguei M. Beloussov, Costa Del Sol (SG); Mark Shmulevich, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 231 days.

(21) Appl. No.: 15/642,479

(22) Filed: Jul. 6, 2017

(65) Prior Publication Data

US 2019/0014176 A1 Jan. 10, 2019

(51) Int. Cl.
*H04L 29/08* (2006.01)
*H04L 12/24* (2006.01)

(52) U.S. Cl.
CPC ...... *H04L 67/1097* (2013.01); *H04L 41/5019* (2013.01)

(58) Field of Classification Search
CPC . H04L 47/2425; H04L 65/80; H04L 67/1097; H04L 41/5019; H04L 41/50
See application file for complete search history.

(56) References Cited

U.S. PATENT DOCUMENTS

| | | | |
|---|---|---|---|
| 10,055,446 B2* | 8/2018 | Pattanaik | H04L 9/3297 |
| 2003/0055882 A1* | 3/2003 | Kawamura | H04L 41/5019 709/203 |
| 2005/0220095 A1* | 10/2005 | Narayanan | H04L 63/126 370/389 |
| 2015/0281117 A1* | 10/2015 | Kunde | H04L 41/5019 709/226 |
| 2017/0126684 A1* | 5/2017 | Armknecht | G06F 21/645 |
| 2018/0260583 A1* | 9/2018 | Doerner | G06F 21/64 |

* cited by examiner

*Primary Examiner* — Benjamin R Bruckart
*Assistant Examiner* — Tien M Nguyen
(74) *Attorney, Agent, or Firm* — Arent Fox LLP; Michael Fainberg

(57) ABSTRACT

A system and method is provided for service level agreement (SLA) based data storage and verification. According to one exemplary aspect, a method includes storing in electronic memory SLAs associated with a user of client devices and receiving from one of the user a request to verify data previously stored on a remote storage device. Furthermore, the method includes receiving from the client device, for example, a hash value of the data relating to the file and also receiving from a remote storage computer, a hash value created by the remote storage computer for the data that was previously stored on the remote storage computer. Moreover, a processor compares the received hash value and the hash value created by the remote storage computer and transmits a confirmation signal to the client device verifying integrity of the file if the processor determines that the respective hash values match.

18 Claims, 11 Drawing Sheets

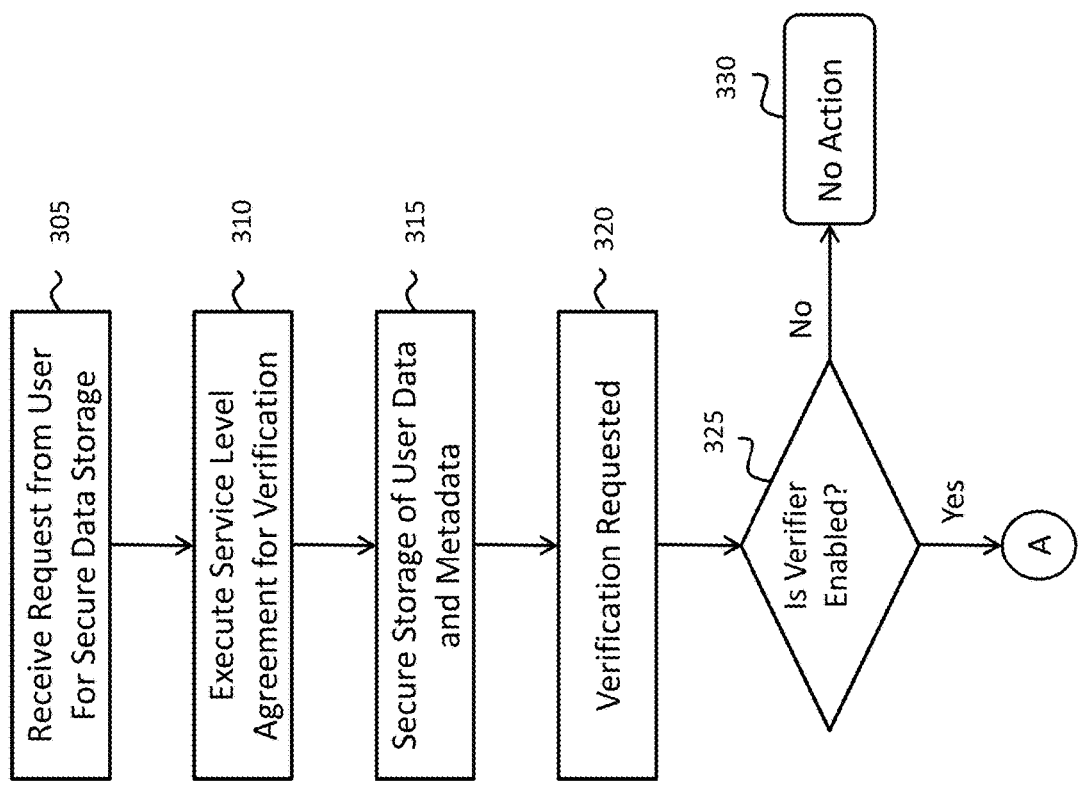

SYSTEM AND METHOD FOR SERVICE LEVEL AGREEMENT BASED DATA STORAGE AND VERIFICATION

TECHNICAL FIELD

The present disclosure generally relates to dynamic electronic data storage, and, more particularly, to a system and method for service level agreement based data storage and verification.

BACKGROUND

Continuing advances in storage technology provide significant amounts of digital data to be stored cheaply and efficiently. However, there are many situations where data (e.g., user data or corporate data) needs to be stored in a database for a significant amount of time, such as years or even decades. For example, in the United States, certain federal and state laws require that all medical institutions store medical data (e.g., medical history, medical care, regular check-ups and monitoring, etc.) on patients during his or her lifetime, or even longer. Moreover, similar requirements apply to banking and financial institutions. For example, according to international rules (e.g., the Basel Agreement), banks are required to keep all financial information for a certain period of time (e.g., data relating to accounts, customers, performed transactions and other information about movement of funds, etc.). In these situations, financial, medical and other organizations are required to store huge amounts of data.

Being required to store large amounts of data for long periods of time creates problems in that it is necessary not only to preserve this information, but also to ensure the integrity and reliability. Moreover, over long periods of time, the data may be subject to a number of threats, including, for example, potential damage by software and/or hardware failure, accidental and/or intentional removal or modification, modification or tampering by fraudsters, and the like.

Furthermore, when using third party storage services, entities often realize that these third party storage vendors may provide varying levels of service and that each service provider may present different user interfaces, interactions, and storage rules. Moreover, these different requirements may change over time, which only further complicates the building of applications and services that depend on the third party storage vendors. As a result, dependence on multiple third party storage vendors and local storage may make it difficult to ensure performance requirements, such as enforcing service level agreements of the applications and the users.

Accordingly, what is needed is a more efficient and unitary system and method for an end user to remotely manage data storage and verification with third party services, such as cloud storage services and blockchain networks.

SUMMARY

Thus, according to an exemplary aspect a system provides user access to distributed storage services, which are used as a back end for implementing a cloud storage. In an exemplary aspect, a user has to execute an agreement with the owner/administrator of this backup service that will provide numerical parameters that specify a set of purchased services. Accordingly, if the user wants to get some specific set of specific feature or additional features from the backup services, then these features should be displayed in this agreement.

Moreover, in the exemplary system, by providing cloud storage service, the exemplary system also ensures that if the customer uses many different cloud storage which stores various types of data and different parts, the system will make sure that the person who granted the service is trusted. In particular, the user may want to know whether his or her data is not lost in the cloud storage, if it is not corrupted, is it available for reading, whether any operations have been carried out on his or her data, whether data integrity is maintained, have some modifications been lost and so on.

Thus, the disclosed system and method provides for the evaluation of the services provided to the end user in which the parameters are used for the level of service evaluation. In one aspect, a blockchain network can be used as an external tool that allows the system and method to ensure that all data placed into the remote storage by the user is maintained with integrity, corresponds to what was placed by the user, and is available to the user. Thus, the exemplary system and method provides for service level agreements that specify data verification algorithms and associated timing parameters.

In this aspect, the system and method can verify the possible modification of the repository of metadata, or a group of files, the renaming of files, or any other operations on data. In this configuration, the system and method can send information to the blockchain network that a file is stored in archive or that it is modified. Using blockchain records, the system and method can further verify that data in the archive is in fact available in the form in which it was placed in the archive by the user.

In one aspect, at the moment of time when the user makes modifications to the date, the system and method places such information and metadata in a blockchain. Secondly, when the user and system wants verify this fact, to find all corresponding records in the blockchain and in the archive, the system and method compares them to verify that everything matches. Different verification methods provided by different service level agreement ("SLA") levels are provided herein. For example, if the system trusts the word of the owner of the archive, then his or her record is sufficient verification. Alternative, if the system does not trust the service provider, then the system will download records from archive, calculate a check sum (e.g., a hash value) of this data, and compare it with those stored in block chain.

In another aspect, another SLA is provided is where verification procedure is located, who performs it and how often. In this aspect, the system may want to indicate that there is a method of evaluation to which the system will initially assume values such that one of the values is that a verification takes place at a time when user refers to backup service via a software client. As such, the customer must operate at a time when the verification is carried out. Another option is that the verification is located outside the verifying server and that the customer simply orders the external verifier to execute the verification procedure. Then, this verification may also be performed on demand mode or in batch mode. A further option of periodicity is also provided in as a way of SLA. For example, the system can perform verification operations periodically, e.g., once a month or once a year, and can do it in the presence of some external event that can potentially affect the storage.

Thus, according to an exemplary aspect, a method is provided for service level agreement (SLA) based data verification. In this aspect, the method includes receiving a request to perform a data verification of data relating to at least one file from a client device and stored on at least one remote storage computer; accessing at least one SLA to determine a procedure for the data verification; receiving a hash value of the data relating to the at least one file that is created when the at least one file is stored on the at least one remote storage computer; requesting the at least one remote storage computer to create a hash value of the data relating to the at least one file previously stored on the at least one remote storage computer; comparing, by a processor, the received hash value created when the at least one file is stored with the hash value created by the at least one remote storage computer; and if the processor determines that the respective hash values match, transmitting a confirmation signal to the client device verifying integrity of the at least one file previously stored on the at least one remote storage computer.

In another exemplary aspect, the accessed at least one SLA indicates the at least one remote storage computer is trusted, and the method further comprises: instructing the at least one remote storage computer to recalculate a hash value of the data relating to the at least one file previously stored on the at least one remote storage computer; transmitting the recalculated hash value to the processor; and comparing, by the processor, the hash value received from the client device and the recalculated hash value received from the at least one remote storage computer.

In another exemplary aspect, the requesting of the corresponding hash value comprises: requesting, by the processor, the data relating to the at least one file previously stored on the at least one remote storage computer; calculating, by the processor, the hash value of the data relating to the at least one file previously stored on the at least one remote storage computer; and comparing, by the processor, the hash value received from the client device and the calculated hash value.

In another exemplary aspect, the method includes calculating a number of times that the processor cannot determine whether the respective hash values match; and if the number of times over a predetermined period is greater than a predetermined threshold, transmitting a notification to the client device that the at least one file previously stored on the at least one remote storage computer may be corrupted or deleted.

In another exemplary aspect, the method includes obtaining, by the client device, at least one of a file ID, a bucket ID, a file version, and a hash value of the at least one file previously stored on the at least one remote storage computer; formulating, by the client device, the transaction from the at least one of a file ID, a bucket ID, a file version, and a hash value of the at least one file; receiving, by the processor, the transaction from the client device; providing the transaction to a transaction collection module; writing, by the transaction collection module, the transaction to a blockchain network.

In another exemplary aspect, the method includes modifying, by the processor, the received transaction to include a transaction signed by the processor before providing the received transaction to the transaction collection module.

In another exemplary aspect, the method includes modifying, by the at least one remote storage computer, the transaction to include a transaction signed by the at least one remote storage computer before providing the received transaction to the transaction collection module.

In another exemplary aspect, the method includes generating an on-demand request as the request to perform the data verification of the data relating to the at least one file stored on the at least one remote storage computer.

In a further aspect, a method is disclosed for service level agreement (SLA) based data verification. In this aspect, the method includes receiving a request to perform a data verification of data relating to at least one file from a client device and stored on at least one remote storage computer; accessing, by a processor, the at least one SLA to determine a fault tolerance for the at least one file stored on the at least one remote storage computer; sending, by the processor, to the at least one remote storage computer a request to store at least k derivatives of the at least one file in the remote storage computer; and transmitting, to the client device, an indication of the location of the k derivatives of the at least one file in the at least one remote storage computer.

In another exemplary aspect, the method includes sending, by the processor, to the at least one remote storage computer a request to store at least k+m derivatives of the at least one file in k+m servers of the remote storage computer; and transmitting, to the client device, an indication of the location of the k+m derivatives of the at least one file in the k+m servers of the at least one remote storage computer.

In another exemplary aspect, a system is provided for service level agreement (SLA) based data verification. In this aspect, the system includes electronic memory configured to store at least one SLA associated with a user of a client device; and a verifying server communicatively coupled to the electronic memory and including a processor configured to: receive a request to perform a data verification of data relating to at least one file from the client device and stored on at least one remote storage computer, access the at least one SLA to determine a procedure for the data verification, receive a hash value of the data relating to the at least one file that is created when the at least one file is stored on the at least one remote storage computer, request the at least one remote storage computer to create a hash value of the data relating to the at least one file previously stored on the at least one remote storage computer, compare the received hash value created when the at least one file is stored with the hash value created by the at least one remote storage computer, and if the respective hash values match, transmit a confirmation signal to the client device verifying integrity of the at least one file previously stored on the at least one remote storage computer.

In another exemplary aspect, a system is provided for service level agreement (SLA) based data verification. In this aspect, the system includes electronic memory configured to store at least one SLA associated with a user of a client device; and a verifying server communicatively coupled to the electronic memory and including a processor configured to: receive a request to perform a data verification of data relating to at least one file from the client device and stored on at least one remote storage computer, access the at least one SLA to determine a fault tolerance for the at least one file stored on the at least one remote storage computer, transmit to the at least one remote storage computer a request to store at least k derivatives of the at least one file in the remote storage computer, and transmit, to the client device, an indication of the location of the k derivatives of the at least one file in the at least one remote storage computer.

According to another exemplary aspect, a system and method is provided for setting and executing a service level agreement between a consumer and providing data storage service to the consumer with possible data verification. Thus, in this aspect, the method includes defining a value of data verification by a contract executed between a service consumer and the service providing data storage. Moreover, the contract indicates the measured numerical values, which are one of the levels of service provided to the verifier that is responsible for compliance with the user data in the data storage services. According to this method, verification options correspond to the implementation of one or more of the conditions provided by the service from at least one of actions, location(s), time and execution result.

In another aspect, the service consumer of the exemplary list may be one or more of an individual user, a collective member, and a corporate user.

In another aspect, the service level agreement between the service consumer and the service provide verification value c using a distributed database with immutable objects. In a refinement of this aspect, the verification value c uses a distributed database for the immutable objects having a value indicating whether or not the verification is performed. In another refinement of the method, the service user uses the client arm, which handles requests and redirects user to the proxy. Moreover, the proxy forwards and processes requests from the client's arm on the data storage service, which is a collection of data storage, which can be a file and/or file metadata. In yet a further refinement, the data verification indicates verification parameter data by recording transactions in a distributed database with signatures of the immutable objects transaction implemented by one or more of the client workstation client, the proxy, and the service data storage, wherein at the time, the verification carries out a comparison of the data with the stored transaction information regarding the data sent.

In another aspect of this method, the data storage service can be an object repository and/or block-level storage.

In yet another aspect, the verification can be performed by a verifier or verification module that can be implemented on one or more of the client workstation, the proxy, the storage service and the distributed database immutable objects.

In yet another aspect, the verification of the parameter value is a value that indicates whether or not the data verification is performed. In a refinement of this aspect, if the data verification is performed, the verification parameter data describes one or more of verification of the data by comparing the hash value stored on the service storage data to the transmitted hash value; verification of the data by comparing the data from the data storage service by recalculating the hash value from the storage service, and verification of the data by comparing the counted hash of the downloaded data to a data storage service with the stored data transmitted hash value.

In yet a further aspect, a portion of the data verification algorithm uses one or more of integrity checking, data recovery, electronic digital signature, homomorphic encryption and quantum encryption. In a refinement of this aspect, the algorithms used can be, for example, MD5, SHA-1, SHA-2, GOST R 34.11, TTH, ED2K, AICH, CRC-32, HMAC, FDH, El Gamal scheme, the DSA, ECDSA and GOST R 34.10-2012, GOST R 34.10-94 and GOST R 34.10-2001, GOST R 34.310-2004, Schnorr signature, the BLS scheme, a GMR scheme, RSA, PKCS #1, RSA-PSS and the like.

In yet another aspect, the distributed database of immutable objects can be a blockchain network or service, that is built according to certain rules of a chain of transactions generated by the blocks, according to blockchain technology, has an API (Application User Interface), and is a non-modifiable data repository. In a further refinement, the distributed database with immutable objects can be Bitcoin, Ethereum, Litecoin, Blackcoin, Dash, Namecoin, Bytecoin, BOLOS, Eris, Lisk, NEM, GEO, CoinJoin, Lightning Network, Bolt, Ripple and the like.

In yet another aspect of the disclosed method, the immutable objects within a distributed database can be, for example, public (i.e., available to all users) so that everyone has the right to read and add to the data; limited, in which the right to add the data is limited or a certain group of persons, or are available to all, and read access is limited or a certain group of persons, or accessible to all; and private, in which the addition of the right data are centralized, and has read access or a limited circle of persons defined, or are available to all.

In another aspect of the disclosed method, the values specified in the service level agreement determine the possibility of a deferred query on data verification and described by one or more terms including, for example, date, time, number and for additional conditions.

In an exemplary aspect in which the service level agreement between the service consumer and a service provides a numerical value of the service to the consumer, the method includes providing levels of end of the procedure to record the consumer's point of view, producing the recording procedure, with the possibility of consumer choice of methods for determining that the procedure is finished writing data to the storage service; and taking the value that the condition of the end of the procedure to record either condition is not controlled by the end of the recording process.

Moreover, in one aspect, if the termination condition recording/writing procedure is performed, the value end of the recording conditions of the procedure described by one or more of the possible values of the parameter conditions of the end of the list entry procedure can be related to one or more of a completion of a minimum placement of derived data, a completion of a minimum placement of derived data with the minimum requirement for fault tolerance, a completion of placement with the performance of fault tolerance requirements, and a completion of placement with the performance and fault tolerance requirements with optimized data placement. Moreover, in this aspect, the level of the minimum placement of derived data is placing a set of derived data to guarantee the restoration of the original file. In a refinement, the requirement of fault tolerance is given in the number of servers at the same time failed.

In yet another aspect of the exemplary method, the service level agreement between the service consumer and a service provides a setting that provides levels of verification of data sets and it is as a set of objects that the verification is performed or verification set of objects is not performed. Moreover, in this aspect, if the data verification is performed collectively, the verification value parameter describes one or more methods of performing data verification for one data object, performing data verification for one data store, performing data verification for all data storage per user, and performing data verification for all data storage for all users. In this aspect, it should be appreciated that the data may be files and/or metadata files.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 3A-3C illustrate a flowchart for a method of service level agreement based data storage and verification according to an exemplary aspect.

DETAILED DESCRIPTION

Figure 1A:
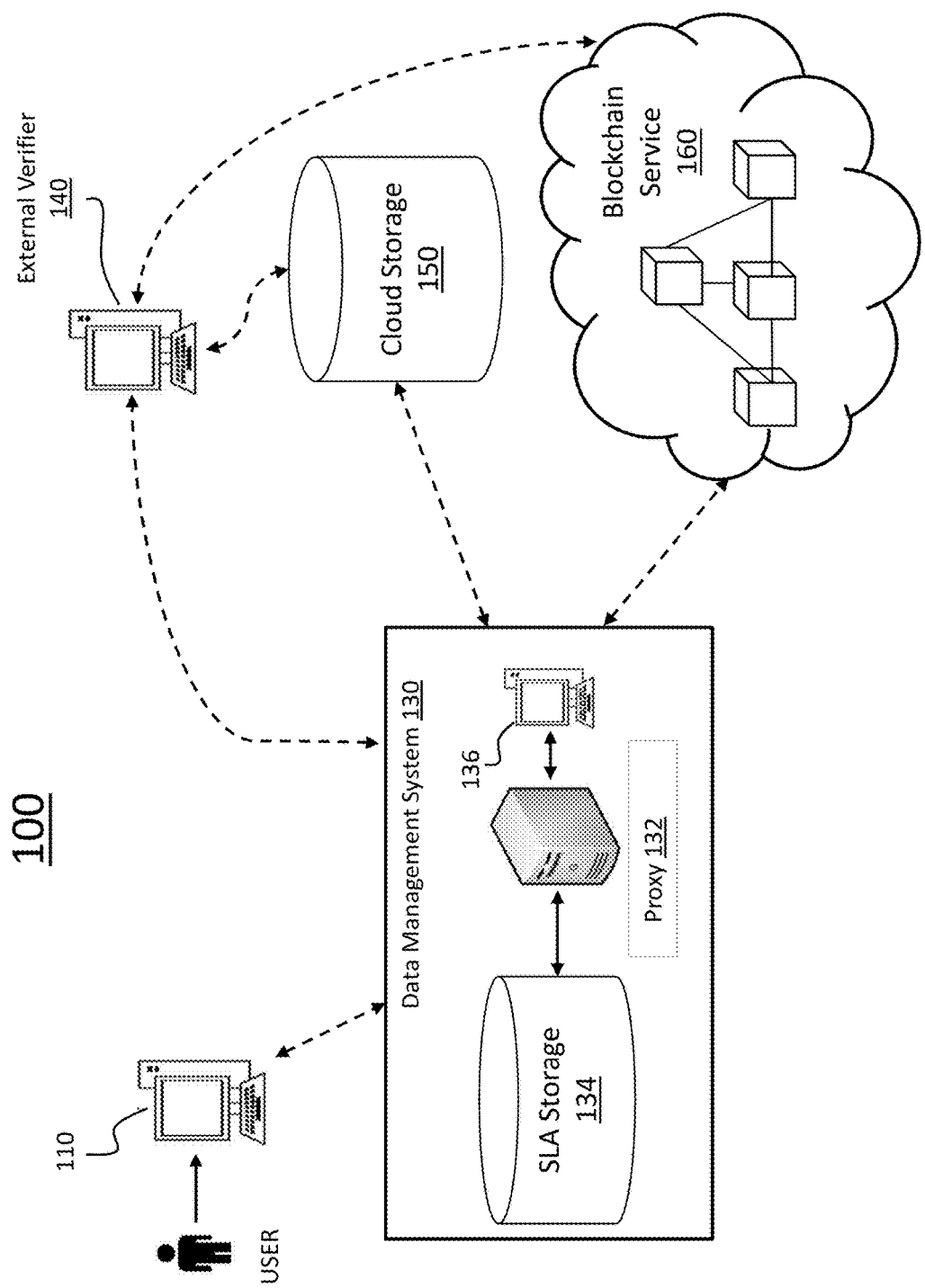
FIG. 1A illustrates a block diagram for a system for service level agreement based data storage and verification according to an exemplary aspect.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

FIG. 1A illustrates a block diagram for a system for service level agreement based data storage and verification according to an exemplary aspect. As generally shown, a data management system 130 is provided to manage electronic data storage between a client device 110 and remote storage infrastructures. The client device 110 can be any type of computing device, such as a laptop, a desktop, a tablet, a mobile phone and the like, and while it is generally described as only being a single client device, it should be appreciated that the disclosed system 100 and algorithms described herein can be provided for a multitude of client devices. Moreover, the data management system 130 includes a proxy server 132 and SLA storage 134, the details of which will be described in detail below. Each should be appreciated that each component in system 100 includes an appropriate application program interface (API) for communicating with the other components in the system as would be appreciated to one skilled in the art.

In the exemplary aspect, the remote data storage can be any type of remote data archive, such as an online/remote file storage service, a cloud computing service 150 and a blockchain service 160. Thus, the remote data storage may be one or more physical databases, distributed databases, a single storage node, a plurality of storage nodes, or the like that returns data to the SLA based data management system 130 (including verifying server 132, which can be considered a proxy server) which then communicates the data to the user of the client device 110.

In some aspects, examples of such cloud based services 150 include Amazon® Simple Storage Service ("S3"), and Microsoft® Azure ("Azure"). In general, companies such as Microsoft® and Amazon® (i.e., "storage service providers") set up networks and infrastructure to provide one or more multi-client services (such as various types of cloud-based storage) that are accessible via the Internet and/or other networks to a distributed set of clients in a company, organization or the like. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

Moreover, the blockchain service 160 can be an existing (public or private) distributed network formed from a plurality of nodes or computers, for example. According to the exemplary aspect, the blockchain service 160 maintains a continuously-growing list of data records hardened against tampering and revision and is composed of data structure blocks that exclusively hold the data received from the client device 110 and metadata from the data management system 130. In particular, as will be discussed in more detail below, after the client device 110 sends a request to create/modify a data file to the blockchain service 160, for example, the transaction in the blockchain records blocks and confirm when and in what sequence the data transactions enter and are logged in the existing blockchain. Preferably, every computer node in the blockchain service 160 has a copy of the growing blockchain. This design avoids the need to have a centralized database managed by a trusted third party. Moreover, each of the computer nodes can validate the data, add hash values to their copy of the blockchain and then broadcast these additions to other nodes in accordance with existing blockchain methodologies.

Although the components are all shown as communicating directly through data management system 130 in FIG. 1A, each of the components of the system 100 can be configured to communicate data across one or more networks according to the exemplary aspect. For example, the applicable networks can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the applicable networks may employ various well-known protocols to communicate information amongst the network resources. In one aspect, the applicable network can be part of the Internet or intranet using various communications infrastructure such as Ethernet, WiFi and the like.

According to an exemplary aspect, the SLA between the data management service and user of the client device 110 provides for the storage and the verification of storage data by the client device 110 in the remote data storage 150 and/or 160. Thus, in the exemplary aspect, the data management system 130 is configured to provide as web services (e.g., a service orientated architecture layer) a single user interface for the user of each client device 110 to access storage and data verification operations across multiple storage servers, including the storage servers associated with third-party cloud storage 150, for example, and computes of blockchain service 160. This user interface may allow calls to perform generic data operation requests, such as instructions to write, read, modify, delete or create data files. The data management system 130, and, more particularly, the verifying server 132, may then translate such requests to a specific data operation request tailored for a specific storage server using a software component provided for that remote storage component.

According to the exemplary aspect, the data management system provides for SLA based storage access and verification system, and, therefore, also provides the infrastructure to provide storage and verification resources based upon the user's needs. As will be explained in detailed below, requests for data creation and modification can be accompanied with a profile or identification of the user of a client device 110. In general, a user may be an actual user, but can also be a software application, a programmatic software, or a process.

In an example aspect, the user identification is associated with an executed SLA that is stored in SLA storage 134 and defines the requirements for data storage and verification. The SLA storage 134 can be any type of electronic memory, and in one aspect is a structure database, which is configured to store user information, associated SLA, as well as configuration and operation of the available cloud storage 150 and block chain networks 160. A profile based on the SLA executed by the user may define the storage and verification requirements and options enabled by the user. For example, the SLA may indicate the timing of verification as well as the acceptable fault tolerance of user data. It should be appreciated that SLA storage 134 is an optional component and that executed service level agreements can be executed and stored according to other mechanisms as would be understood to one skilled in the art.

For example, after the initial storage of user data, the user may want to confirm that the data is not lost in the cloud storage 150, that it is not corrupted, that it is available for reading, whether any operations have been executed on the data, whether data integrity has been maintained, have any modifications been lost, and the like. Based on an SLA selected by the user and found in SLA storage 134, the data management system 130 can provide a data verification to the user in which the metadata is written by the verifying server 132 of the data management system 130, in separate files, and encrypted by its own key, to which the client device 110 does not have access. Similarly, the user data is encrypted and decrypted only on the client workstation 110, by its own keys, to which the verifying server 132 does not have access. Moreover, all data is subjected to control of its integrity, such as by signature or any other methods. The data and metadata can be kept in encrypted form with a hash value being calculated from the encrypted data that is publicly accessible.

Figure 1B:
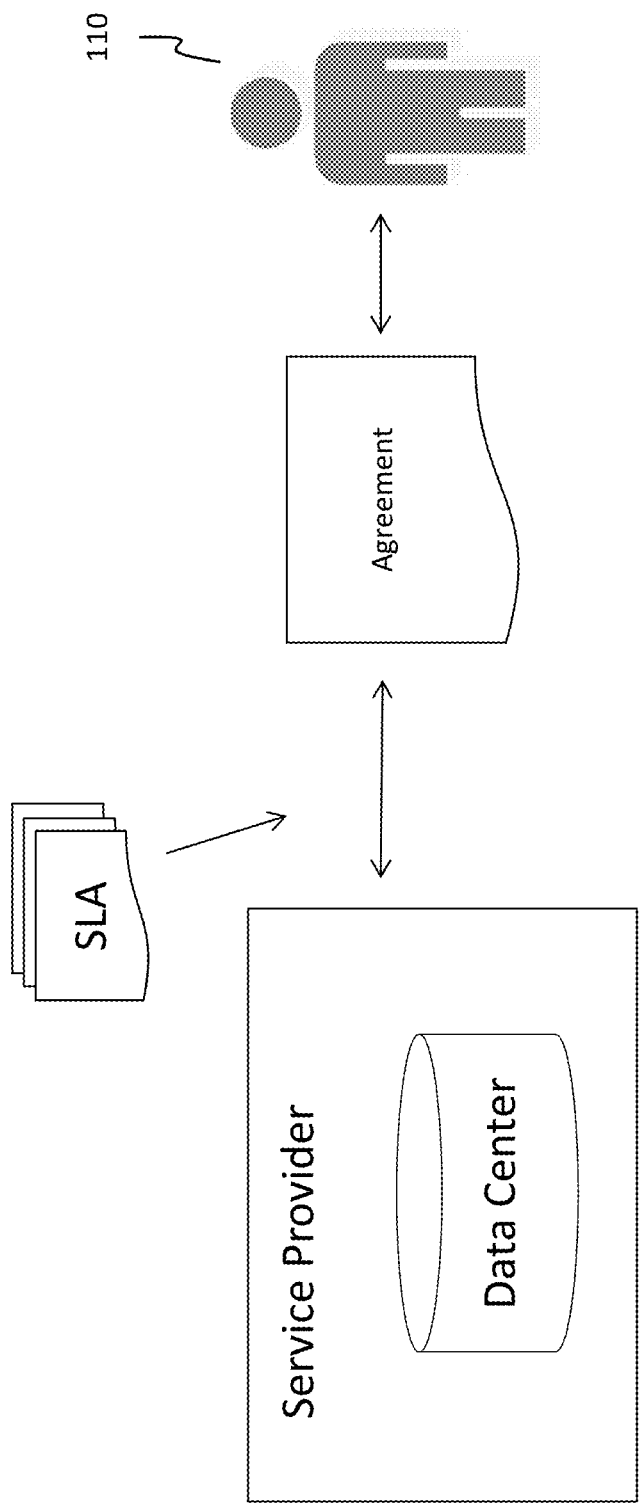
FIG. 1B illustrates a block diagram illustrating the relationship for executing the service level agreement for data storage and verification according to an exemplary aspect.

FIG. 1B illustrates a block diagram illustrating the relationship for executing the service level agreement for data storage and verification according to an exemplary aspect. As generally shown, the user 110 executes an agreement with the service provider (e.g., data management system 130) that provides data storage and verification to one or more data centers, such as cloud storage 150 and/or blockchain service 160. As described herein, during the data storage and verification processes, the user is able to select and update the SLA to execute and confirm desired rights and restrictions with the service provider. For example, in one aspect, the user is able to execute the SLA to use the blockchain service 160 that specifies in the agreement between the user 110 and the service provider the terms for how the user data is stored and can be subsequently verified using the blockchain services 160. The advantages of such a relationship will become apparent in the detailed description below.

Figure 2:
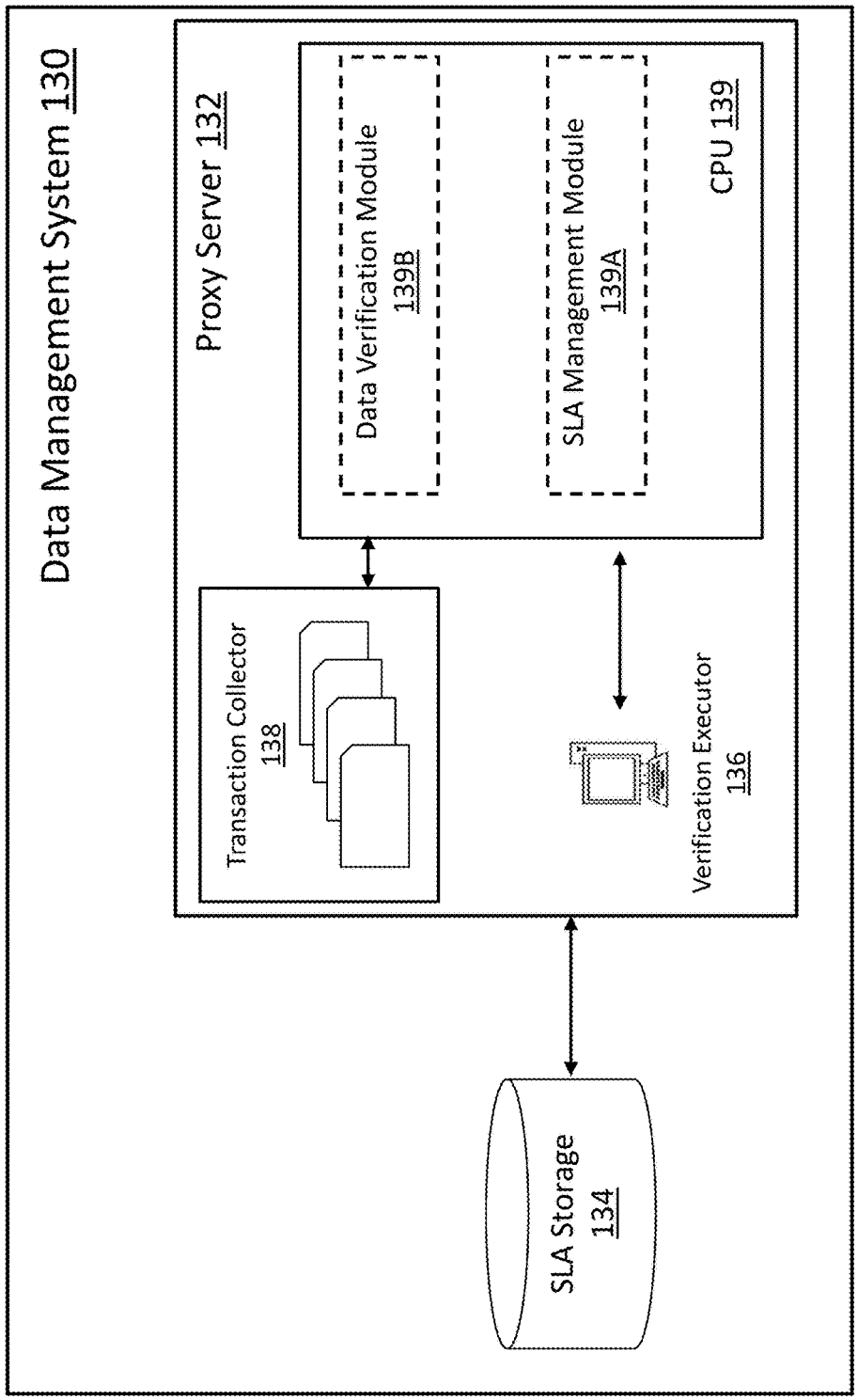
FIG. 2 illustrates a detailed block diagram of the data management system 130 illustrated in FIG. 1A according to an exemplary aspect.

FIG. 2 illustrates a detailed block diagram of the data management system 130 illustrated in FIG. 1A according to an exemplary aspect. As described above, the data management system 130 includes a verifying server 132 that acts as the intermediary for requests from client devices 110 and the third-party remote storage, such as cloud storage 150 and blockchain service 160. Moreover, the verifying server 132 can include a central processing unit ("CPU") 139 provided to, among other things, execute an SLA management module 139A and a data verification module 139B. In this aspect, the SLA management module 139A and the data verification module 139B each include software code (e.g., processor executable instructions) in memory, which may be configured to execute/facilitate the storing and verification of user data and file metadata in the remote storage according to an exemplary embodiment, as will be discussed in more detail below.

In general, the SLA management module 139A is provided to execute and identify the pertinent SLA in response to a user's request to create and/or modify a data file. In this regard, the SLA management module 139A identifies the particular SLA and determine which verifications terms are enabled to perform the verification of user data in remote storage (including the timing of such verification). In turn, the data verification module 139B, is configured to perform the actual verification procedures discussed in detail below, include the coordinating of data communications with cloud storage 150 and/or blockchain service 160, as well as the calculating and comparing of hash values, as described herein. For purposes of this disclosure below with respect to the exemplary algorithms, the disclosure generally refers to the data management system 130 and/or CPU 139 and/or one of the specific modules as shown to perform the various steps of the algorithms.

As further shown in FIG. 2, the verifying server 132 includes a verifier or verification executor 138 that is a separate software module to perform the verification algorithms described below. The verification executor 138 may communicate with external remote data storage via data verification module 139B in one aspect. As further shown, a transaction collector 138 is provided as a software module provided to formulate transactions for writing into the blockchain service 160, the details of which will be described below.

As used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

Figure 3B:
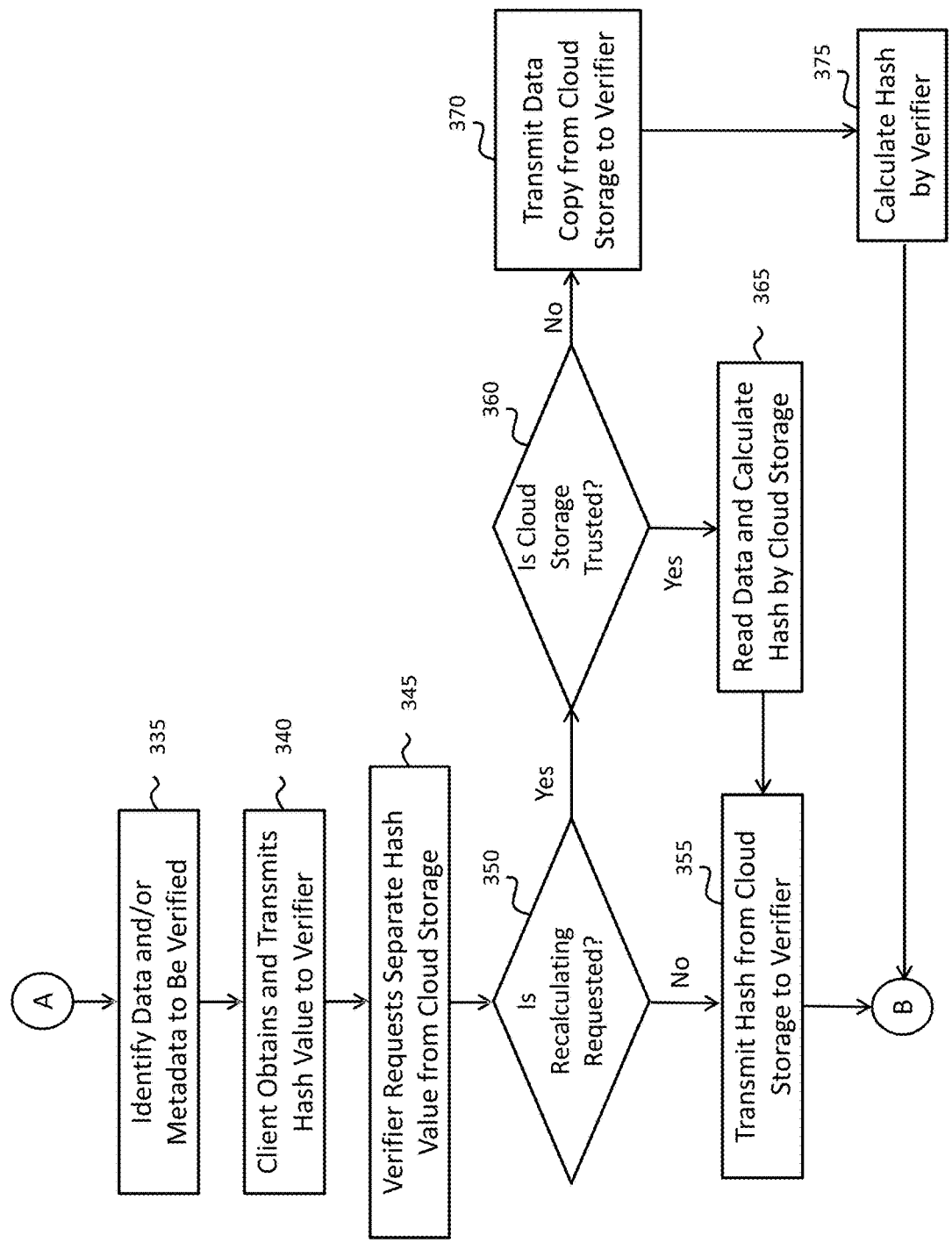
Figure 3C:
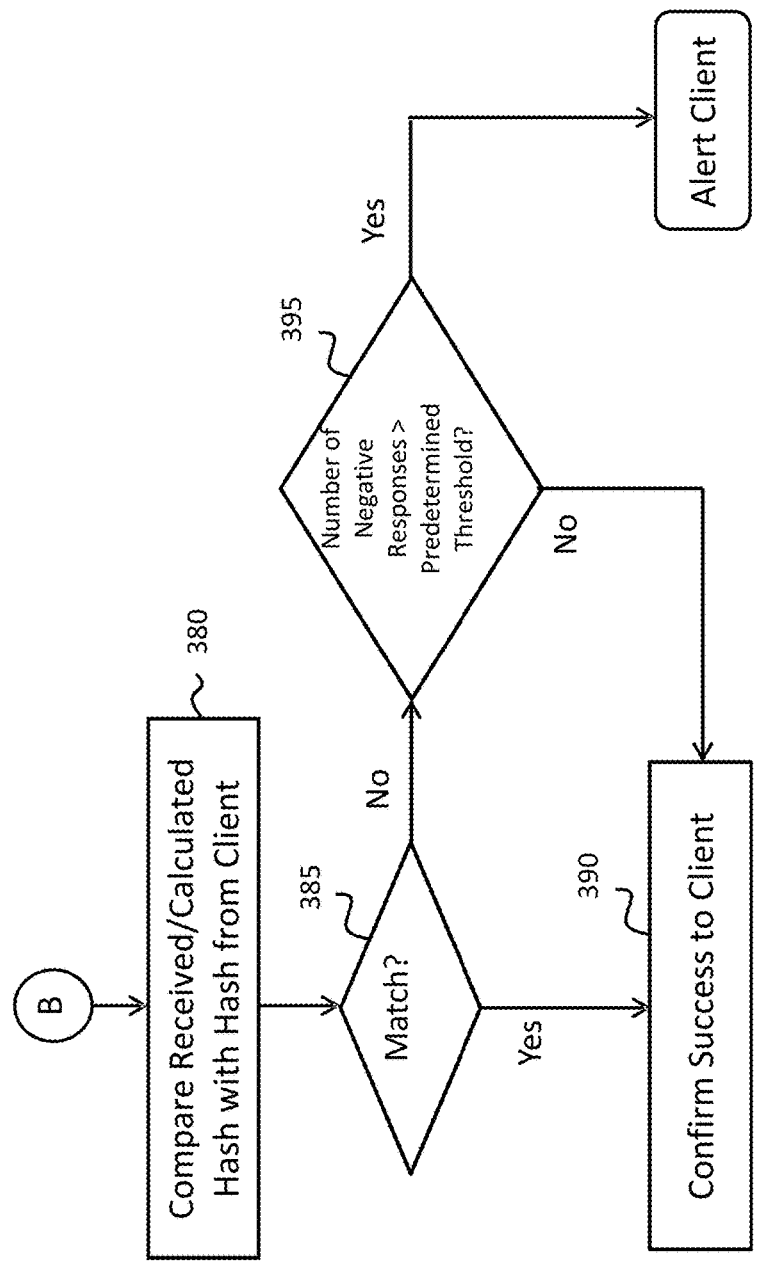

FIGS. 3A-3C illustrate a flowchart for a method of service level agreement based data storage and verification according to an exemplary aspect. Accordingly to this aspect, verification is performed by the verifier (or verifier executor), which can be a verification system or module 136 that is a component of data management system 130. In an alternative aspect, the verification system can be an external verification system 140, or a component of the client device 110, or a component of the cloud storage 150, or a component of the blockchain service 160. Moreover, in one aspect, the location/implementation of the verifier is set forth in the SLA defined between the user and data storage service, which can be specified by the user when modifying or creating files or metadata of files. In one aspect, the verifier can be a downloadable software program that is downloaded to the client device 110.

As shown, initially, at step 305, the user of client device 110 sends a request to data management system 130 for secure data storage. Assuming the user has not previously stored data using the service, the data management system 130 will access a new SLA from SLA storage 134 to be executed with the user at step 310. For example, the SLA can be an electronic agreement specifying the terms and levels of data storage and verification as sought by the user. Upon execution of the SLA, the user can initiate data storage at step 315 by uploading electronic data files to data management system 130, for example. In turn, the data management system 130 can broker the electronic storage of such files in the remote cloud storage 150 and/or blockchain service 160, for example. In general, the data management system 130 is described as facilitating the storage of user data (e.g., actual data files on the client device 110) as well as file metadata, which can include changes (e.g., additions, removals, modifications, etc.) to the actual files.

In any event, at step 320, a request is made to perform a verification of the stored data and/or metadata in the remote data storage locations (e.g., cloud storage 150). In one aspect, the verification request is made periodically by the client device 110 and is set based on the terms of the SLA. In another aspect, the SLA enables the user of the client device 110 to request the verification operation on demand. At step 325, a preliminary check is made by the data management system 130 as to whether the verifier is enabled. For example, upon receiving a verification request from client device 110, the data management system 130 can identify the SLA in database 134 associated with the client device 110 and analyze the terms of the SLA to determine whether the user has enabled the verifier at step 325. If the verifier has not been enabled, the method proceeds to step 330 where no action is performed, although in one aspect, the user can be prompted by a user interface to revise the SLA and enable the verifier.

Alternatively, if the verifier is enabled, the method proceeds to step 335 as shown in FIG. 3B. Specifically, the data management system analyzes the request at step 335 from the client device to identify the terms of the SLA and which user data and/or metadata is to be subject of the verification operation. In exemplary aspect, the data can be a particular file, or folder of files, or all of the user data, for example, that was previously stored in the remote storage at step 315 and the SLA defines the terms for the storage and verification of that data. Next, the verifier 136 obtains a hash value of the user data and/or file metadata. This hash value may be requested from the client device 110 at step 340 or provided as part of the verification request from the client device 110, for example. In one aspect, the client device 110 computes the hash value of the user data and/or file metadata upon request. In another aspect, the hash value is stored in memory. In either case, next, at step 345, the verifier 136 in parallel to step 350 or after receiving the hash value from client device 110 establishes communication with the cloud storage 150, for example, and then transmits a request for the corresponding hash value of the file metadata stored in the cloud storage 150.

In general, it is noted that the hash value of the data file and/or metadata can be calculated using known values with the resulting value having a fixed size. For example, the hash value of the data file can be calculated using the MD5 hashing algorithm, resulting in a 128-bit hash value, or using the SHA-256 hashing algorithm, resulting in a 256-bit hash value, applied to the value of the DATA field, including the braces and stripped of spaces and line break symbols, for example. It should be appreciated that the disclosure is not limited to these two common hashing algorithms according to an alternative aspect.

In any event, at step 350, the data management system 130 determines based on the terms of the SLA whether the verification request is with or without recalculation of the hash value. If a recalculation is not to be performed, the cloud storage 150 retrieves an existing hash value of the user data and/or file metadata returns this value to verifier 136 at step 355. The method then proceeds to step 380 shown in FIG. 3C where the verifier 136 compares the hash value received from the client device 110 with the hash value received from the cloud storage 150. A match indicates that user data and/or file metadata stored in the cloud storage is verified and a confirmation of success is transmitted from the verifier 136 to the client device 110 as a single-bit response: "yes" or "no". In one aspect, if a positive response does not arrive to the client device 110 within a certain time period, the response is deemed be negative. In another aspect, the verifier counts the number of negative responses (i.e., the number of times the comparison cannot be completed) and compares this number at step 395 with a predetermined threshold. In this aspect, if the number of negative responses is less than a predetermined threshold within a given time period (e.g., n times per year), the verifier interprets the verification operations as a success and confirms the success to the client device 110 at step 390. Alternatively, if the number of negative responses surpasses a predetermined threshold, the client device 110 is notified of that the data in cloud storage 150 may be corrupted, missing or the like (i.e., is not verified to be safe).

Referring back to step 350, if the verifier 136, based on the SLA, determines that the verification operation should be performed by checking the hash value with a recalculation, the verifier 136 determines, by checking a database, for example, whether the cloud storage 150 is trusted. If so, the method proceeds to step 365 where the verifier 136 requests the cloud storage 150 to read the user data and/or file metadata remotely stored thereon and calculate a corresponding hash value that is then transmitted back to the verifier 136 at step 355. Thus, the verifier 136 has determined that the cloud storage 150 is trusted and that the recalculating of the hash value will be done properly. Alternatively, if the cloud storage 150 is not trusted, or if the SLA requires the verifier to calculate the hash value, the verifier 136 transmits a request to the cloud storage 150 for the user data and/or file metadata, which may be in encrypted form, and transmit actual copies of this information to the verifier 136 at step 370. Upon receiving the copies of the data and/or metadata, the verifier calculates a hash value at step 375 and then proceeds to step 380, discussed in more detail above, where this hash value is compared with the has value from client device 110 to verify the data and/or metadata is correctly stored in the cloud storage 150.

In a further exemplary aspect, the data management system 130 can facilitate data storage of user files on client device 110 in the blockchain service 160. In general, it is understood that the blockchain network is trusted and unbreakable, i.e., the algorithms used in the blockchain network cannot be hacked with the use of brute force or other known methods. As such, the data obtained from the blockchain network will be correct and includes total communication security thereof. Moreover, according to the exemplary aspect, the use of the blockchain service 160 is specified by the SLA executed between the user and the data management system 130 upon the user creating the files and is used constantly thereafter when the user modifies any of the user file or the metadata of a file. In this aspect, the client device 110 does not interact directly with the blockchain service 160, but instead this arrangement is brokered by data management system 130.

In a further refinement of this aspect, the user can execute the SLA to define the type of blockchain network used for the data storage and verification algorithms described herein. For example, the user can select the blockchain network from one of a public, private, or corporate blockchain network. For each such blockchain network, the client device 110 is informed by the verifying server 132 as to the selected SLA. Moreover, the initiating entity of the writing to the selected blockchain network 150, which can be the client device 110, the verifying server 132, or the cloud storage 150, is registered in the public blockchain network 150 in one aspect.

Moreover, regardless of the selected blockchain network, a transaction collector is provided that is a software module provided to formulate transactions for writing into the blockchain service 160. According to the exemplary aspect, the transaction collector 138 can be executed as a separate software module in the verifying server 132 of the data management system 130. Alternatively, the transaction collector can be implemented and in the client device 110, as a downloadable software application, for example.

Moreover, in this aspect, the cloud storage 150 is configured to store information related to the stored data. For example, the cloud storage 150 can include a database configured to store the file identification (i.e., "FID") that is an identifier of the cloud data storage service that enables the data management system 100 to identify the user files stored remotely. The cloud storage 150 can also include a software "bucket" or "container", which is a software storage element for objects being stored or other object storage techniques, the file version, the hash values 9 described above, which can include hash values of changes to the file or hash values of the entire file that can be constructed as a Merkle Tree of subhash values for individual file segments, and the like.

According to the exemplary utilization of blockchain service 160, at any given moment of time after initial storage of the user data and/or file metadata, the system 100 (e.g., the client device 110) can verify whether the given file has been written. The data for the verification of the file can be taken from the API of the cloud storage 150, from logs, or in some other way, for example. During the verification process, the system 100 provides the ability to obtain signatures of the client device 110 and of the verifying server 312, in one example. The verification operation requires a reconstruction of the transaction data and the checking thereof against the data on the cloud storage 150.

Figure 4A:
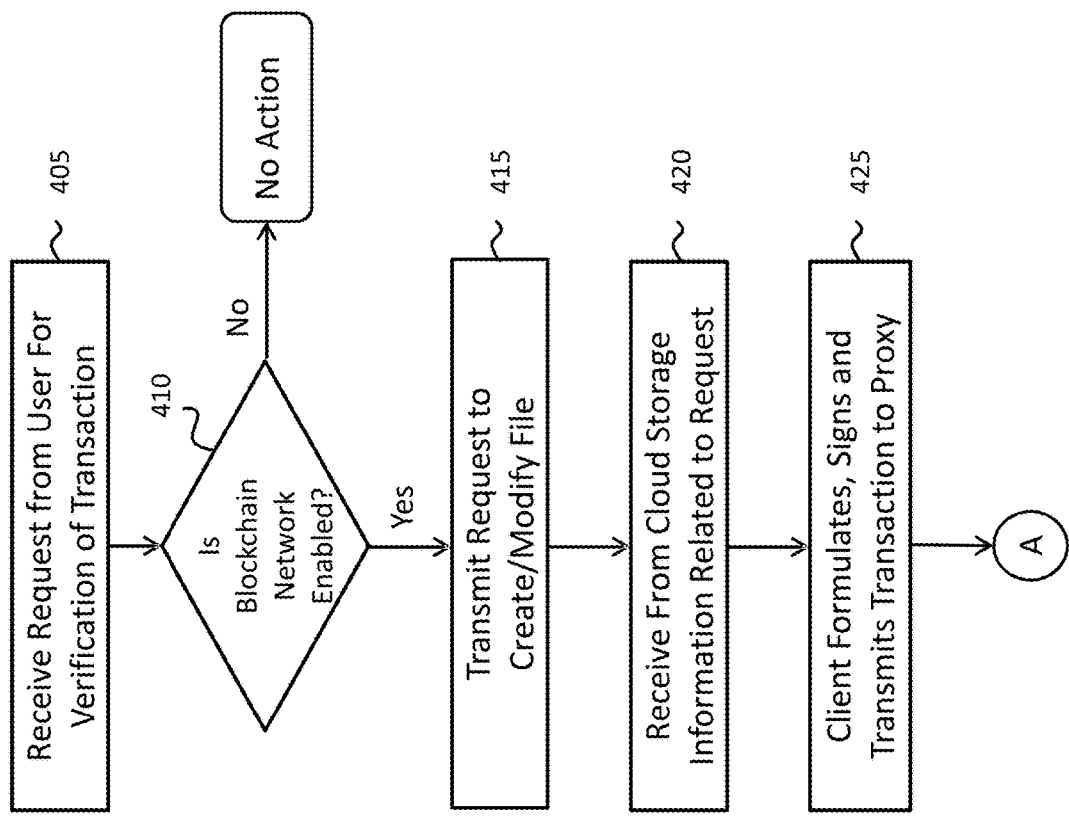
FIGS. 4A-4B illustrate a flowchart for a method of using a blockchain network with service level agreement based data storage and verification according to an exemplary aspect.
Figure 4B:
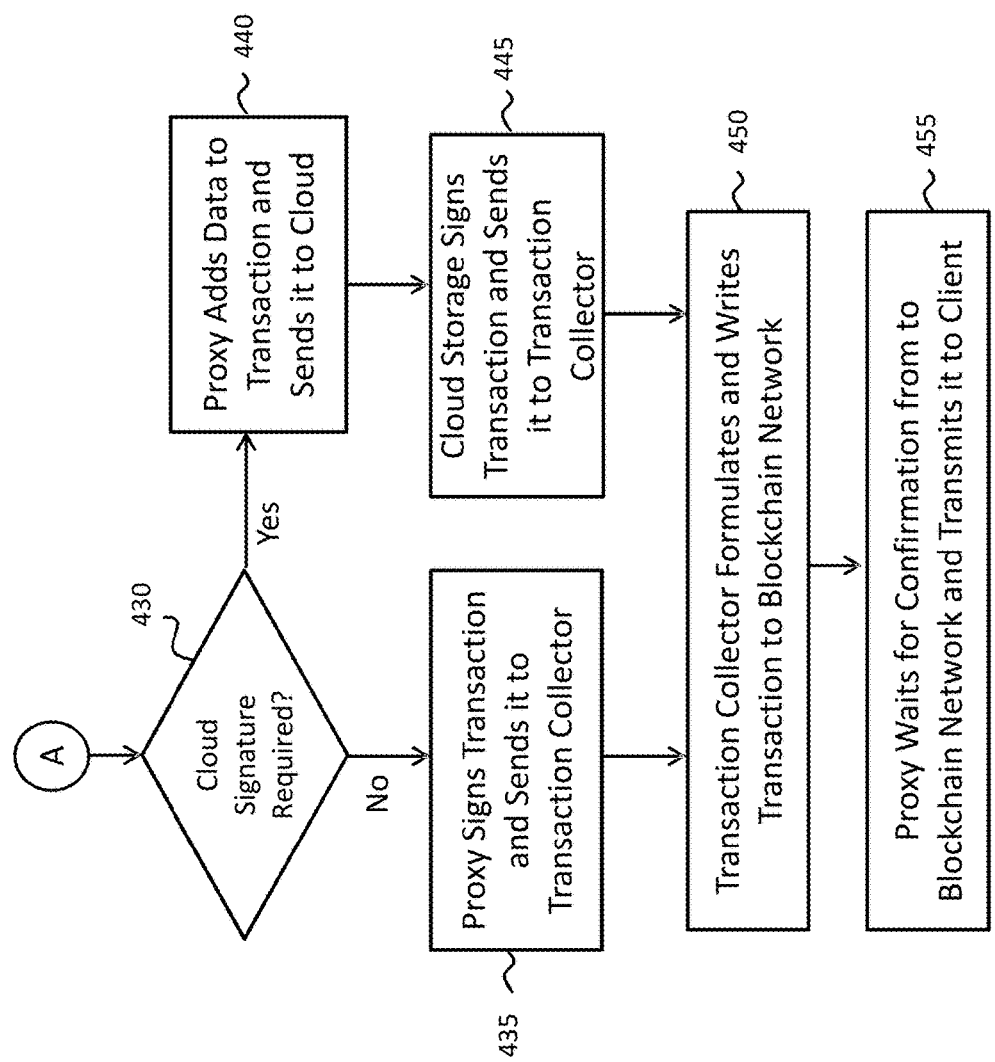

FIGS. 4A-4B illustrate a flowchart for a method of using a blockchain network with service level agreement based data storage and verification according to an exemplary aspect. In a similar manner as described above, at a first step 405, the data management system 130 receives a request from a user for verification of a data transaction using a blockchain service 160. At step 410, the verifying server 132 accesses the SLA storage 134 to determine whether the SLA for the specific user of client device 110 has enabled the blockchain network at step 410. If not enabled, no verification action is performed, but the user may be provided with an option to update the SLA and enable the blockchain service 160 according to one aspect.

If the blockchain service 160 is enabled, the verification operation can be executed by writing a transaction into the blockchain service 160 with the signing of the transaction by the client workstation 110 and/or the verifying server 132. Thus, as shown at step 415, the client device 110 transmits to the cloud storage 150 a request to create or modify a user file. In one further aspect, the user of client device 110 can execute the SLA to define the desired use of the blockchain network 150. As described above, the SLA is specified by the user and is determined by an indicator of the time of accessibility of the blockchain network 150. In this aspect, the SLA is used for group operations with succession mode. In one aspect, the user of the client device 110 can select an SLA without use of the blockchain network 150 and the client device 110 will be notified by the verifying server 132 as to the selected SLA (i.e., in response to step 410). In another aspect, the user of the client device 110 can select an SLA on use of a blockchain network 150 for one file and the writing to the blockchain network 150 for this selected file is performed continuously. In a further aspect, the user of the client device 110 can select an SLA on use of a blockchain network 150 for a bucket and the writing to the blockchain network 150 for the selected bucket (i.e., the container of files) is done continuously. In yet a further aspect, the user of the client device 110 can select an SLA on use of a blockchain network 150 for all files of the user and the writing to the blockchain network 150 for all files is done continuously. Finally, if the SLA is provided for a group of users, the user can select an SLA on use of a blockchain network 150 for all files of all users and the writing to the blockchain network 150 is performed continuously for all files of all users.

Assuming the blockchain service 160 is enabled and the client device transmits the request at step 415, in response to this request, the cloud storage, access and transmits at step 420 to the client device transaction related information including, for example, the FID, cloud, bucket, version, hash value, and the like. Then at step 425, the client device 110 formulates the requested transaction (e.g., create, modify, delete a file) using the received information (i.e., the FID, Cloud, Bucket, Version, hash value), signs the transaction including this information, and transmits the transaction to the verifying server 132.

The method then proceeds to the steps illustrated in FIG. 4B. In particular, at step 430, the verifying server 132 determines, based on the SLA, whether a cloud signature is required. If the SLA does not require a signature by cloud storage 150, the method proceeds to step 435 where the verifying server 132 adds data/metadata to the transaction, provides a digital signature on the transaction and sends the transaction to transaction collector 138. In one aspect, step 435 is optional and the verifying server 132 does not add a digital signature to the transaction. Upon receipt, the transaction collector 312 formulates the transaction and writes it to the blockchain service 160, which records the transaction into blocks with the sequence based on how the data transactions enter and are logged into the existing blockchain data structure. The verifying server 132 then waits for the confirmation from the blockchain service 160 and, upon receipt, notifies the client device that the transaction has been logged and verified successfully in the blockchain service 160.

Referring back to step 430, according to one aspect, the SLA can require that the cloud storage 150 in addition to the client device 110 provides a digital signature on the transaction. In this instance, the data management system 130 confirms with the SLA that the cloud storage 150 is determined to be a trusted network. Thus, if cloud storage 150 is required to provide a digital signature at step 430, the method proceeds to step 440 where in an optional step the verifying server 132 can add data and a digital signature to the transaction (based on the FID, cloud, bucket, version, and/or hash value, for example) and transmits the transaction to cloud storage 150. In turn, the cloud storage 150 also provides a digital signature on the transaction at step 445 before transmitting it to the transaction collector 138. The method then again proceeds to step 450 where the transaction collector 138 formulates the transaction and writes it to the blockchain service 160, as described above.

In yet a further aspect, the exemplary system and method provides an SLA that defines the consistency for the user data and/or file metadata stored in the remote storage locations. According to the exemplary aspect, the SLA on consistency determines the ending of a procedure and is specified by the user of the client device 110 when changing or creating files or file metadata. Moreover, the SLA is determined by an indicator of the time of determination of the consistency of the file or the file metadata.

In general, the exemplary system contemplates two ways of interacting with the cloud storage for consistency, with each way providing four levels of consistency in the executed SLA. Moreover, communication can be performed synchronously between the client device 110 and the cloud storage 150 in which the cloud storage 150 ends the action in accordance with the established level of consistency. In this aspect, the operation is not returned to the client device 110 until the operation is executed. The status describing the status of the operation is returned with no additional waiting time. As such, exit from the operation signifies the ending of the operation.

In an alternative aspect, the SLA can also defined the client device 110 to communication asynchronously with the cloud storage 150. In this aspect, the cloud storage 150 transmits the information on the completion of an intermediate action even though the action may not be fully completed. The identifier of the operation is returned to the client device on an ongoing or continuous basis with a waiting period for the action to complete.

In general, data replication to provide data consistency is the storage of each block of data (i.e., file or object, depending on the architecture of the data-storage system) in several copies on different disks or different nodes of the system. Replication makes it possible to ensure maximum efficiency of data access, including a significant increase in speed of read access to data frequently used by different clients. Moreover, noiseless (or lossless) coding is based on the use of mathematical algorithms that make it possible, to generate n chunks (i.e., data fragments or "derivatives") of a block of data using compression techniques in such a way that any k chunks will be sufficient to recover the initial block of data. Each of the n chunks obtained should be written to a separate disk, and, preferably, to a separate server to ensure high availability of the data. The reliability of a scheme of noiseless coding with parameters n,k (an "(n,k) scheme") is comparable to the reliability with replication of data with n−k+1 copies of each data block. Thus, the use of noiseless coding makes it possible to reduce considerably the overheads on data storage necessary for data replication—the redundancy of data storage (i.e., including the ratio of the volume of storable data to the volume of useful data) for an (n,k) scheme is equal to n/k (the size of a data chunk is approximately equal to $Size_{Block}/k$, where $Size_{Block}$ is the volume of the initial block of data). The most widely used error-correcting codes in modern software systems of data storage are Reed-Solomon codes and variations, such as Cauchy codes, for example. According to an exemplary aspect, the disclosed system 100 provides four levels of consistency for the SLA for each user of a client device 110.

Figure 5A:
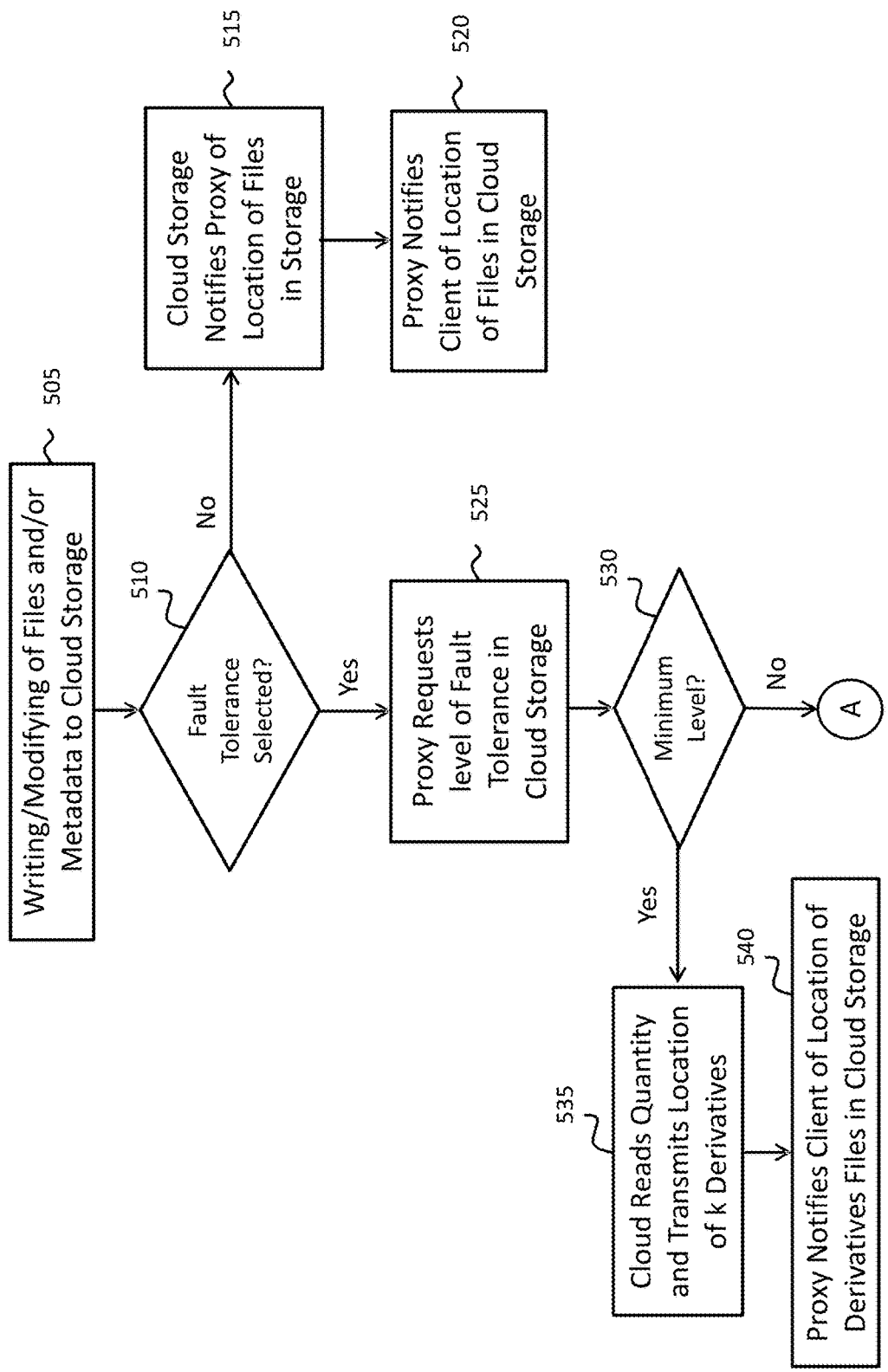
FIGS. 5A-5B illustrate a flowchart for a method for providing service level agreement based data consistency according to an exemplary aspect.
Figure 5B:
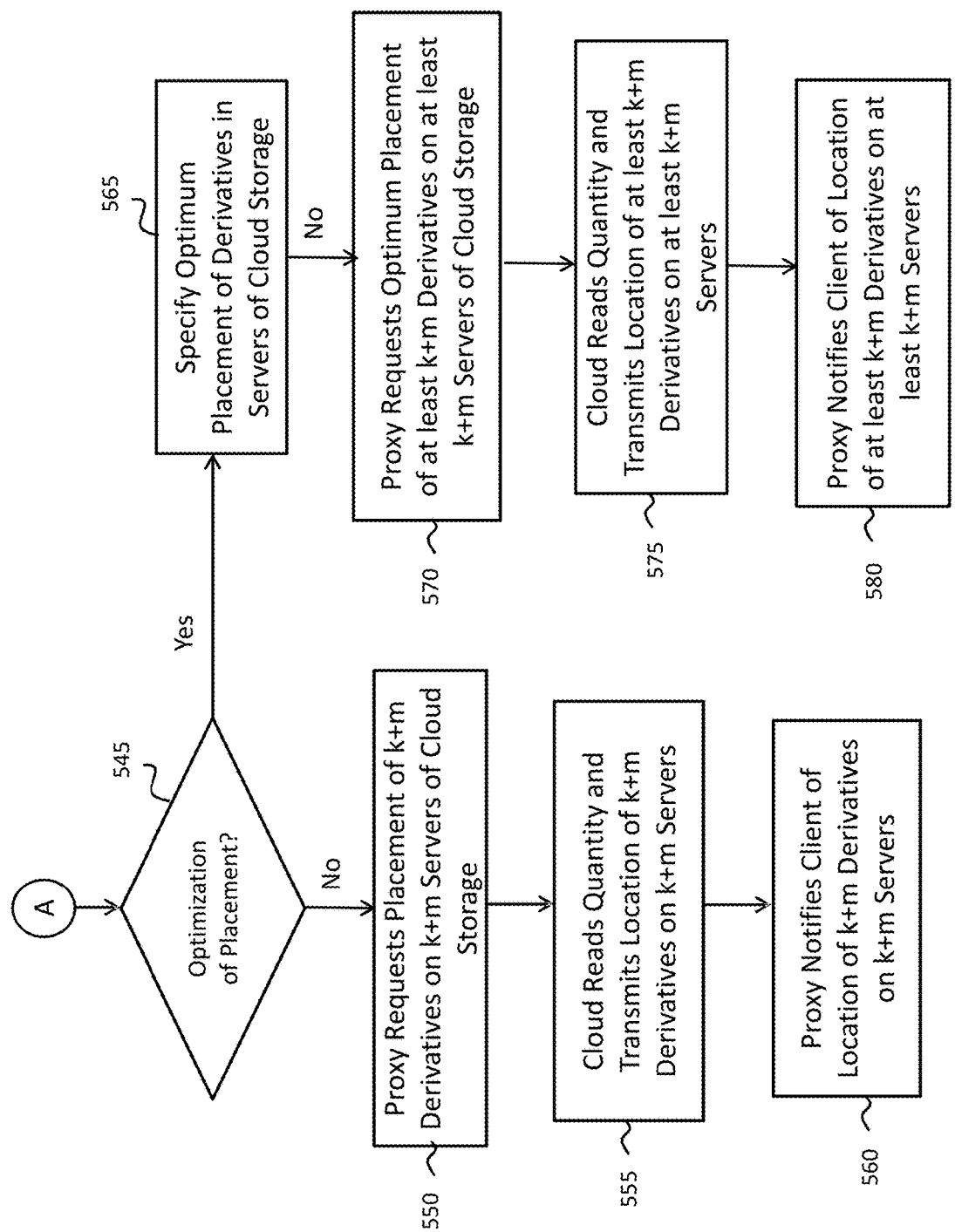

FIGS. 5A-5B illustrate a flowchart for a method for providing service level agreement based data consistency according to an exemplary aspect. As shown, initially at step 505, the client device 110 makes a request to write or modify user data and/or file metadata to cloud storage 150. The details of this process are described above and will not be repeated herein. Next, at step 510, the verifying server 132 identifies the SLA associated with the user of the client device 110 and determines if fault tolerance has been selected. If fault tolerance is not selected in the SLA, the verifying server 132 informs the cloud storage 150, which in turn, provides a notification to the verifying server 132 of the location of the uses files in the cloud storage 150 at step 515. Then at step 520, the verifying server 132 notifies the client device 110 of the location of files in the cloud storage 150.

Alternatively, if fault tolerance is selected at step 510, the method proceeds to step 525 where the verifying server requests the cloud storage 150 to perform fault tolerance of the user files and/or file metadata. In one aspect, the verifying server 132 requests the placement of k derivatives of the user data and/or file metadata in the cloud storage 150. If, at step 530, the verifying server 312 determines that the minimum level of fault tolerance has been requested according to the SLA, the method proceeds to step 535 where the cloud storage 150 reads the quantity of k derivatives placed in the remote storage and notifies the verifying server 132 as to the placement of the k derivatives in the cloud storage 150. In turn, the verifying server 132 notifies the client device 110 as to the placement of the k derivatives in the cloud storage 150.

Alternatively, if the SLA requests a higher level of fault tolerance (i.e., not the minimum level), the method proceeds to step 545 to determine whether the user has requested optimization of place of the user data and derivatives in the cloud storage 150. If optimization has not been requested at step 545, the method proceeds to step 550. In this aspect, placement with fulfillment of the fault tolerance requirement is guaranteed, even in the event of failure of any m servers of the cloud storage 150, where M can be expressed in percentage of the total number of servers, for example. Thus, after the sending by the verifying server 132 of the created or modified user file or file metadata, the verifying server 132 then requests the placement of at least k+m derivatives on at least k+m servers in the cloud storage 150 at step 550. Then, at step 555, the cloud storage 150 reads the quantity of derivatives placed and, after the placement of k+m derivatives on k+m servers, the cloud storage 150 notifies verifying proxy server 132 as to the placement of at least k derivatives on at least m servers in the cloud storage 150. Furthermore, at step 560, the verifying server 132 notifies the client device 110 as to the placement of the k+m derivatives on at least k+m servers in the cloud storage 150.

Alternatively, if the SLA defines derivative placement with fulfillment of the fault tolerance requirement with optimization of placement, the placement is guaranteed, even in the event of failure of any m servers. This level of SLA is an optimal placement according to a predetermined scenario and the criterion of optimization is specified statically by the client device 110 or dynamically by the cloud storage 150. It should be appreciated that optimization is more technically efficient way to store and restore the data. For example, typically to ensure data recovery the system needs at least k+m derivatives stored on k+m servers. However, applying optimization techniques, the data storage mechanism can increase the number of servers and number of derivatives stored on a server. In this case, data can be restored using only one server that stores all the date, for example. Thus, optimization increases a redundancy of storage servers according to heuristic methods, for example.

Thus, as further shown, at step 565, the verifying server 132 specifies (step 565) and requests (step 570) the placement of at least k+m derivatives on at least k+m servers with optimization of placement in the cloud storage 150. Next, at step 575, the cloud storage 150 reads the quantity of derivatives placed and, after the placement of at least k+m derivatives on k+m servers with optimization of placement in the cloud storage 150, the cloud storage 150 notifies the verifying server 132 as to the placement of at least k+m derivatives on at least m servers with optimization of placement in the cloud storage 150. Finally, at step 580, the verifying server 132 notifies the client device 110 as to the placement of at least k+m derivatives on at least k+m servers with optimization of placement in the cloud storage 150. Thus, according to the exemplary aspect, the SLA enable the user to define the varying available levels of data consistency for the user data and/or file data remotely stored in the servers of cloud storage 150.

In yet a further aspect, the SLA enables an on-demand verification in which the user of the client device 110 can request verification of data and/or metadata stored remote in cloud storage 150 and/or blockchain service 160 at a specified time. In other words, the SLA describes an interaction at any moment of time according to the blockchain service 160.

In this aspect, the user of the client device 110 selects a file (or bucket or all files or the like) stored on the client device and also in the remote storage to be verified. Moreover, the user can select the SLA on-demand verification for a one-time verification from this item. The user can then define the date and time of the one-time verification, which is sent to the verifying server 132. The verifying server 132 is configured to store in a database (e.g., SLA storage 134) the selected item and designated verification date and time. One the actual date and time is detected by the verifying server 132, the verifying server 132 initiates the selected SLA on verification. Then, the proxy server can perform the verification operation described above in FIGS. 3A-3C, according to one exemplary aspect. In another aspect, the user can select a timetable for defining the verification operation, which is also transmitted and tracked by verifying server 132.

Figure 6:
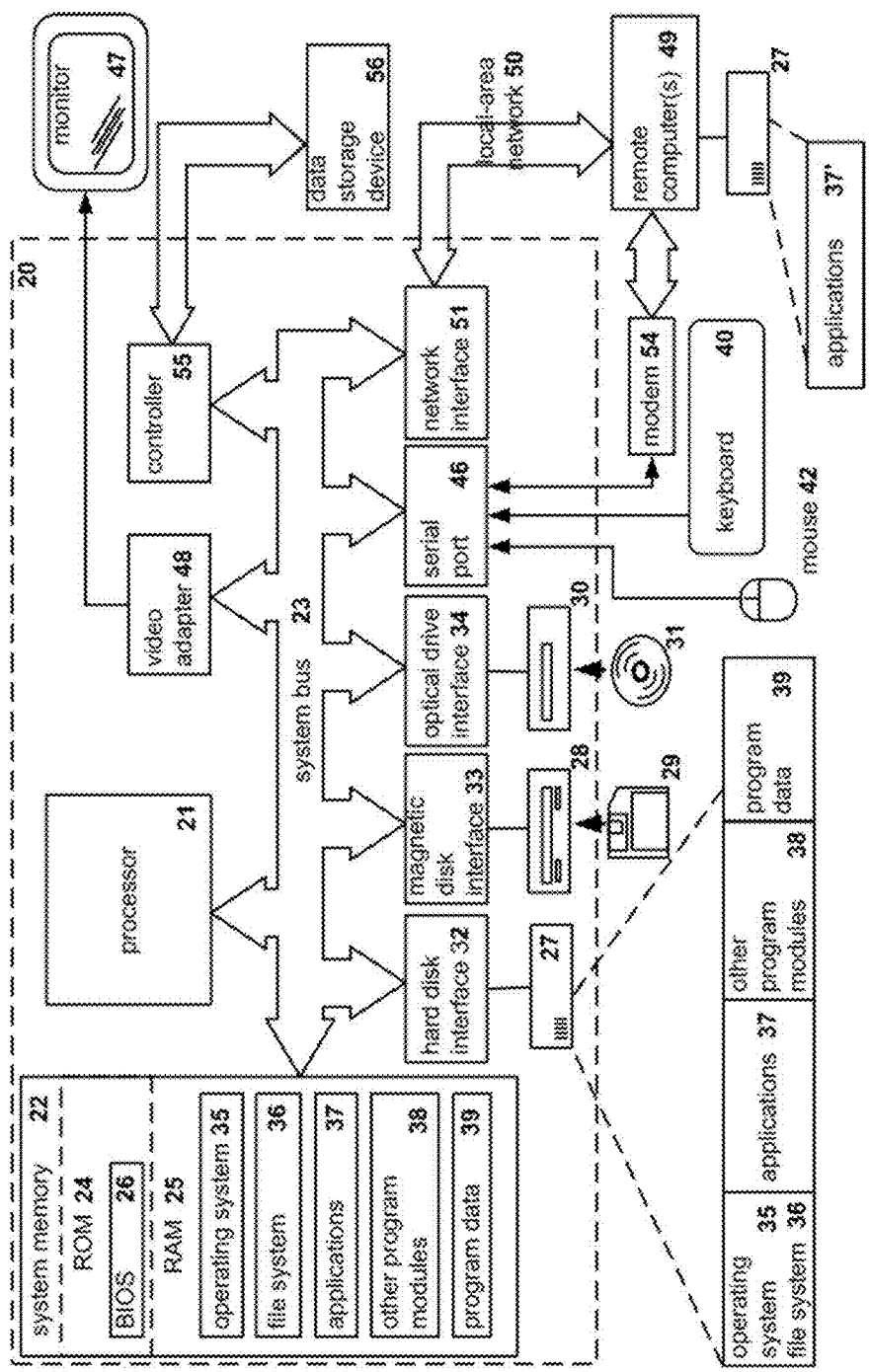
FIG. 6 illustrates an example of a general-purpose computer system (which may be a personal computer or a server) on which the disclosed systems and method can be implemented according to an example aspect.

FIG. 6 illustrates an example of a general-purpose computer system (which may be a personal computer or a server) on which the disclosed systems and method can be implemented according to an example aspect. It should be appreciated that the detailed general-purpose computer system can correspond to data management system 130 to implement the algorithms described above.

As shown, the computer system 20 includes a central processing unit 21, a system memory 22 and a system bus 23 connecting the various system components, including the memory associated with the central processing unit 21. The central processing unit 21 can correspond to the CPU 139 and the system memory 22 can correspond to SLA storage 134 of FIG. 2, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes. According to one aspect, the remote computer(s) 49 can correspond to client device 110, the cloud storage 150 and/or computers forming the blockchain service 160, as discussed above. For example, the remote computer(s) 49 can be touchscreen tablets, smartphones, IoT devices (e.g., without screens, and the like.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for service level agreement (SLA) based data verification, the method comprising:
   receiving a request to perform a data verification of data relating to at least one file from a client device and stored on at least one remote storage computer;
   accessing at least one SLA to determine a procedure for the data verification, wherein the SLA indicates: timing of the verification, acceptable fault tolerance of the data, location of the data and whether a blockchain network verification is enabled;
   obtaining a hash value of the data, relating to the at least one file, that is created when the at least one file is stored on the at least one remote storage computer;
   requesting the at least one remote storage computer to create a hash value of the data relating to the at least one file previously stored on the at least one remote storage computer;
   comparing, by a processor, the received hash value created when the at least one file is stored, with the hash value created by the at least one remote storage computer;
   responsive to determining that the SLA indicates that the blockchain network verification is enabled, verifying using the blockchain network a transaction signed by a client device or a verifying server and being associated with at least one of a file ID, a bucket ID, a file version and the hash value of the at least one file previously stored on the at least one remote storage computer; and
   responsive to determining that the compared hash values match and the transaction is verified by the blockchain network, transmitting a confirmation signal to the client device verifying integrity of the at least one file previously stored on the at least one remote storage computer.

2. The method according to claim 1, wherein the accessed at least one SLA indicates the at least one remote storage computer is trusted, and the method further comprises:
   instructing the at least one remote storage computer to recalculate a hash value of the data relating to the at least one file previously stored on the at least one remote storage computer;
   transmitting the recalculated hash value to the processor; and
   comparing, by the processor, the hash value received from the client device and the recalculated hash value received from the at least one remote storage computer.

3. The method according to claim 1, wherein the requesting the at least one remote storage computer to create a hash value of the data relating to the at least one file previously stored on the at least one remote storage comprises:
   requesting, by the processor, the data relating to the at least one file previously stored on the at least one remote storage computer;
   calculating, by the processor, the hash value of the data relating to the at least one file previously stored on the at least one remote storage computer; and
   comparing, by the processor, the hash value received from the client device and the calculated hash value.

4. The method according to claim 1, further comprising:
calculating a number of times that the processor cannot determine whether the respective hash values match; and
responsive to determining that the number of times over a predetermined period is greater than a predetermined threshold, transmitting a notification to the client device that the at least one file previously stored on the at least one remote storage computer may be corrupted or deleted.

5. The method according to claim 1, further comprising:
obtaining, by the client device, at least one of a file ID, a bucket ID, a file version, and a hash value of the at least one file previously stored on the at least one remote storage computer;
formulating, by the client device, the transaction from the at least one of a file ID, a bucket ID, a file version, and a hash value of the at least one file;
receiving, by the processor, the transaction from the client device;
providing the transaction to a transaction collection module;
writing, by the transaction collection module, the transaction to the blockchain network.

6. The method according to claim 5, further comprising modifying, by the processor, the received transaction to include a transaction signed by the processor before providing the received transaction to the transaction collection module.

7. The method according to claim 6, further comprising modifying, by the at least one remote storage computer, the transaction to include a transaction signed by the at least one remote storage computer before providing the received transaction to the transaction collection module.

8. The method according to claim 1, further comprising generating an on-demand request as the request to perform the data verification of the data relating to the at least one file stored on the at least one remote storage computer.

9. A system for service level agreement (SLA) based data verification, the system comprising:
electronic memory configured to store at least one SLA associated with a user of a client device; and
a verifying server communicatively coupled to the electronic memory and including a processor configured to:
receive a request to perform a data verification of data relating to at least one file from the client device and stored on at least one remote storage computer,
access at least one SLA to determine a procedure for the data verification, wherein the SLA indicates; timing of the verification, acceptable fault tolerance of the data, location of the data and whether a blockchain network verification is enabled;
obtain a hash value of the data relating to the at least one file that is created when the at least one file is stored on the at least one remote storage computer,
request the at least one remote storage computer to create a hash value of the data relating to the at least one file previously stored on the at least one remote storage computer,
compare the received hash value created when the at least one file is stored with the hash value created by the at least one remote storage computer;
responsive to determining that the SLA indicates that the blockchain network verification is enabled, verify using the blockchain network a transaction signed by a client device or the verifying server and being associated with at least one of a file ID, a bucket ID, a file version and the hash value of the at least one file previously stored on the at least one remote storage computer; and
responsive to determining that the compared hash values match and the transaction is verified by the blockchain network, transmit a confirmation signal to the client device verifying integrity of the at least one file previously stored on the at least one remote storage computer.

10. The system according to claim 9, wherein the accessed at least one SLA indicates the at least one remote storage computer is trusted, and the processor is further configured to:
instruct the at least one remote storage computer to recalculate a hash value of the data relating to the at least one file previously stored on the at least one remote storage computer,
receive the recalculated hash value from the at least one remote storage compute, and
compare the hash value received from the client device and the recalculated hash value received from the at least one remote storage computer.

11. The system according to claim 9,
wherein the processor is further configured to request a corresponding hash value by requesting the data relating to the at least one file previously stored on the at least one remote storage computer, and
wherein the processor is further configured to calculate the hash value of the data relating to the at least one file previously stored on the at least one remote storage computer, and compare the hash value received from the client device and the calculated hash value.

12. The system according to claim 9, wherein the processor is further configured to:
calculate a number of times that the processor cannot determine whether the respective hash values match; and
if the number of times over a predetermined period is greater than a predetermined threshold, transmit a notification to the client device that the at least one file previously stored on the at least one remote storage computer may be corrupted or deleted.

13. The system according to claim 9,
wherein the client device is configured to obtain at least one of a file ID, a bucket ID, a file version, and a hash value of the at least one file previously stored on the at least one remote storage computer, and to formulate the transaction from the at least one of a file ID, a bucket ID, a file version, and a hash value of the at least one file,
wherein the processor is further configured to receive the transaction from the client device and provide the transaction to a transaction collection module that writes the transaction to the blockchain network.

14. The system according to claim 13, wherein the processor is further configured to modify the received transaction to include a transaction signed by the processor before providing the received transaction to the transaction collection module.

15. The system according to claim 14, wherein the at least one remote storage computer is further configured to modify the transaction to include a transaction signed by the at least one remote storage computer before providing the received transaction to the transaction collection module.

16. The system according to claim 9, wherein the client device is further configured to generate an on-demand request as the request to perform the data verification of the data relating to the at least one file stored on the at least one remote storage computer.

17. The system according to claim 9, wherein the electronic memory is a database configured to store the at least one SLA.

18. A non-transitory computer-readable medium storing instructions thereon for service level agreement (SLA) based data verification, comprising instructions for:

receiving a request to perform a data verification of data relating to at least one file from a client device and stored on at least one remote storage computer;

accessing at least one SLA to determine a procedure for the data verification, wherein the SLA indicates: timing of the verification, acceptable fault tolerance of the data, location of the data and whether a blockchain network verification is enabled;

obtaining a hash value of the data, relating to the at least one file, that is created when the at least one file is stored on the at least one remote storage computer;

requesting the at least one remote storage computer to create a hash value of the data relating to the at least one file previously stored on the at least one remote storage computer;

comparing, by a processor, the received hash value created when the at least one file is stored, with the hash value created by the at least one remote storage computer;

responsive to determining that the SLA indicates that the blockchain network verification is enabled, verifying using the blockchain network a transaction signed by a client device or a verifying server and being associated with at least one of a file ID, a bucket ID, a file version and the hash value of the at least one file previously stored on the at least one remote storage computer; and responsive to determining that the compared hash values match and the transaction is verified by the blockchain network, transmitting a confirmation signal to the client device verifying integrity of the at least one file previously stored on the at least one remote storage computer.

\* \* \* \* \*